US008290649B2

(12) United States Patent
Iwashita et al.

(10) Patent No.: US 8,290,649 B2
(45) Date of Patent: Oct. 16, 2012

(54) REGISTRATION-BASED VEHICLE BATTERY CHARGING SYSTEM (75) Inventors: Hiroaki Iwashita, Aichi (JP); Yoshiyuki Mizuno, Aichi (JP); Kenji Tanaka, Aichi (JP); Mikihisa Araki, Aichi (JP); Tomomi Shimizu, Aichi (JP); Masayuki Yurimoto, Toyota (JP); Keiji Yamamoto, Okazaki (JP); Jun Shionoya, Nagoya (JP)

(73) Assignees: Kabushiki Kaisha Tokai Rika Denki Seisakusho, Aichi (JP); Toyota Jidosha Kabushiki Kaisha, Toyota-shi (JP)

( * ) Notice: Subject to any disclaimer, the term of this patent is extended or adjusted under 35 U.S.C. 154(b) by 581 days.

(21) Appl. No.: 12/375,888

(22) PCT Filed: Jul. 11, 2007

(86) PCT No.: PCT/JP2007/063859
§ 371 (c)(1),
(2), (4) Date: Jan. 30, 2009

(87) PCT Pub. No.: WO2008/015893
PCT Pub. Date: Feb. 7, 2008

(65) Prior Publication Data
US 2010/0010698 A1  Jan. 14, 2010

(30) Foreign Application Priority Data

Aug. 2, 2006 (JP) ................................. 2006-210926

(51) Int. Cl.
*B60L 9/00* (2006.01)
*G06F 9/44* (2006.01)
(52) U.S. Cl. ........................................ 701/22; 717/166

(58) Field of Classification Search .................... None
See application file for complete search history.

(56) References Cited

U.S. PATENT DOCUMENTS 7,327,227 B2   2/2008 Ohtaki et al.
7,402,978 B2 * 7/2008 Pryor ............................ 320/104
(Continued)

FOREIGN PATENT DOCUMENTS

CN         1723142      1/2006
JP       2003-023378    1/2003
(Continued)

OTHER PUBLICATIONS

Office Action (and English translation), dated Apr. 20, 2011, issued in corresponding Chinese Application No. 2007800280509.
(Continued)

*Primary Examiner* — Thomas Tarcza
*Assistant Examiner* — Nagi Murshed
(74) *Attorney, Agent, or Firm* — Saul Ewing LLP (57) ABSTRACT

A charging system that facilitates tracking of a stolen charging subject. The charging subject includes a battery and has a unique identification code. A charging device is connected to the battery of the charging subject by an electric cable, and the battery is chargeable. A server is connected to either one of the charging device and the charging subject and manages charging of the charging subject with the charging device. The server is cable of registering an identification code of the charging subject. The server obtains the identification code from the charging subject, determined whether or not the obtained identification code is registered in the server, and transmits to the charging device a charging prohibition command for prohibiting charging of the charging subject with the charging device when the obtained identification code is not registered in the server.

16 Claims, 6 Drawing Sheets

U.S. PATENT DOCUMENTS

| | | | |
|---|---|---|---|
| 2003/0105662 A1* | 6/2003 | Koketsu et al. | 705/13 |
| 2004/0225419 A1* | 11/2004 | Sakai et al. | 701/1 |
| 2005/0016781 A1* | 1/2005 | Muta | 180/65.2 |
| 2005/0044245 A1 | 2/2005 | Hoshina | |
| 2006/0130033 A1* | 6/2006 | Stoffels et al. | 717/166 |
| 2006/0175103 A1* | 8/2006 | Iida et al. | 180/65.4 |
| 2006/0233545 A1* | 10/2006 | Senba et al. | 396/529 |
| 2007/0080827 A1* | 4/2007 | Huang | 340/945 |
| 2007/0126395 A1* | 6/2007 | Suchar | 320/109 |
| 2008/0042810 A1* | 2/2008 | Nakane et al. | 340/426.18 |
| 2009/0192655 A1* | 7/2009 | Ichikawa et al. | 700/291 |
| 2009/0287499 A1* | 11/2009 | Link, II | 705/1 |

FOREIGN PATENT DOCUMENTS

| | | |
|---|---|---|
| JP | 2003-048513 | 2/2003 |
| JP | 2004-284506 | 10/2004 |
| JP | 2004-287720 | 10/2004 |
| JP | 2005-115667 | 4/2005 |
| JP | 2006-006039 | 1/2006 |

OTHER PUBLICATIONS

Form PCT/IB/338 and English translation of the International Preliminary Report on Patentability, dated Feb. 19, 2009, issued in priority International Application No. PCT/JP2007/063859.

International Search Report, dated Sep. 25, 2007, issued in priority International Application No. PCT/JP2007/063859.

* cited by examiner

44 Memory  
45 Registered Vehicle File

| Vehicle ID Code (45a) | Details (45b) | Stolen Vehicle Registration (45c) |
|---|---|---|
| 12345678-9 | Name, Address, Telephone No., etc. | No |
| ........... | ............ | ... |
| ........... | ............ | Yes |
| ........... | | ... |
| | | |
| | | |
| | | |
| | | |
| ⋮ | ⋮ | ⋮ |

Fig.5

44 Memory

Charging History

| Vehicle ID Code | Charging Date and Time | Electricity Station Location |
|---|---|---|
| ........... | ...... | ........... |
| ........... | ...... | ........... |
| ........... | ...... | ........... |
| ........... | ...... | ........... |
| ⋮ | ⋮ | ⋮ |

REGISTRATION-BASED VEHICLE BATTERY CHARGING SYSTEM

CROSS-REFERENCE TO RELATED APPLICATIONS

This application claims the priority of International Application PCT/JP2007/063859, filed Jul. 11, 2007, which claims priority to Japanese Application No. 2006-210926, filed Aug. 2, 2006, the entire contents of which are hereby incorporated herein by reference.

FIELD OF THE INVENTION

The present invention relates to a charging system for supplying a charging subject with electricity from a charging device via an electric cable and charging the subject.

BACKGROUND OF THE INVENTION

Over recent years, hybrid vehicles, which use both an engine and a motor as a drive source, and electric vehicles, which use a motor, have become popular vehicle types as an alternative to engine vehicles, which are driven by only an engine. Such an electric vehicle uses a battery that must be charged when the battery voltage becomes low. For example, the battery may be charged by connecting an input of an external charging device, such as a power feed connector, to a household electrical outlet (utility power, alternating current of 100 V) and connecting the output of the charging device to a charging connector of the vehicle. As another option, an electric vehicle may be connected to and charged at an electricity station.

Furthermore, regardless of whether the vehicle is an engine vehicle or an electric vehicle, antitheft measures must be taken. Patent Document 1 describes an example of an antitheft prevention technique that is unique to electric vehicles. In an electric vehicle, a battery is used as a drive source. With the technique described in Patent Document 1, information related to the charging of the vehicle, such as the state of charge of the battery, is collected as driving information. The collected driving information is transmitted to a management center. The management center tracks a stolen vehicle by determining the location of the vehicle from such driving information.

However, even when the state of charge of the stolen vehicle becomes low, the battery of the stolen vehicle can be charged at an electricity station that is located anywhere. Therefore, the battery of the stolen vehicle can be charged periodically. Since the stolen vehicle, which may be charged periodically, can be driven anywhere, it would be extremely difficult to track the stolen vehicle even with the technique described in Patent Document 1.
Patent Document 1: Japanese Laid-Open Patent Publication No. 2005-115667

SUMMARY OF THE INVENTION

The present invention provides a charging system that allows for a charging subject to be easily tracked even when the charging subject is stolen.

A first aspect of the present invention is a charging system. The charging system is provided with a charging subject including a battery and having a unique identification code. A charging device is connected to the battery of the charging subject by an electric cable to charge the battery. A server, connected to either one of the charging device and the charging subject, registers the identification code of the charging subject and manages charging of the charging subject with the charging device. The server obtains the identification code from the charging subject, determines whether or not the obtained identification code is registered in the server, and transmits to the charging device a charging prohibition command for prohibiting charging of the charging subject with the charging device when the obtained identification code is not registered in the server.

DETAILED DESCRIPTION OF THE PREFERRED EMBODIMENTS

First Embodiment

A charging system according to a first embodiment of the present invention will now be discussed in detail with reference to FIGS. 1 to 5.

Figure 1:
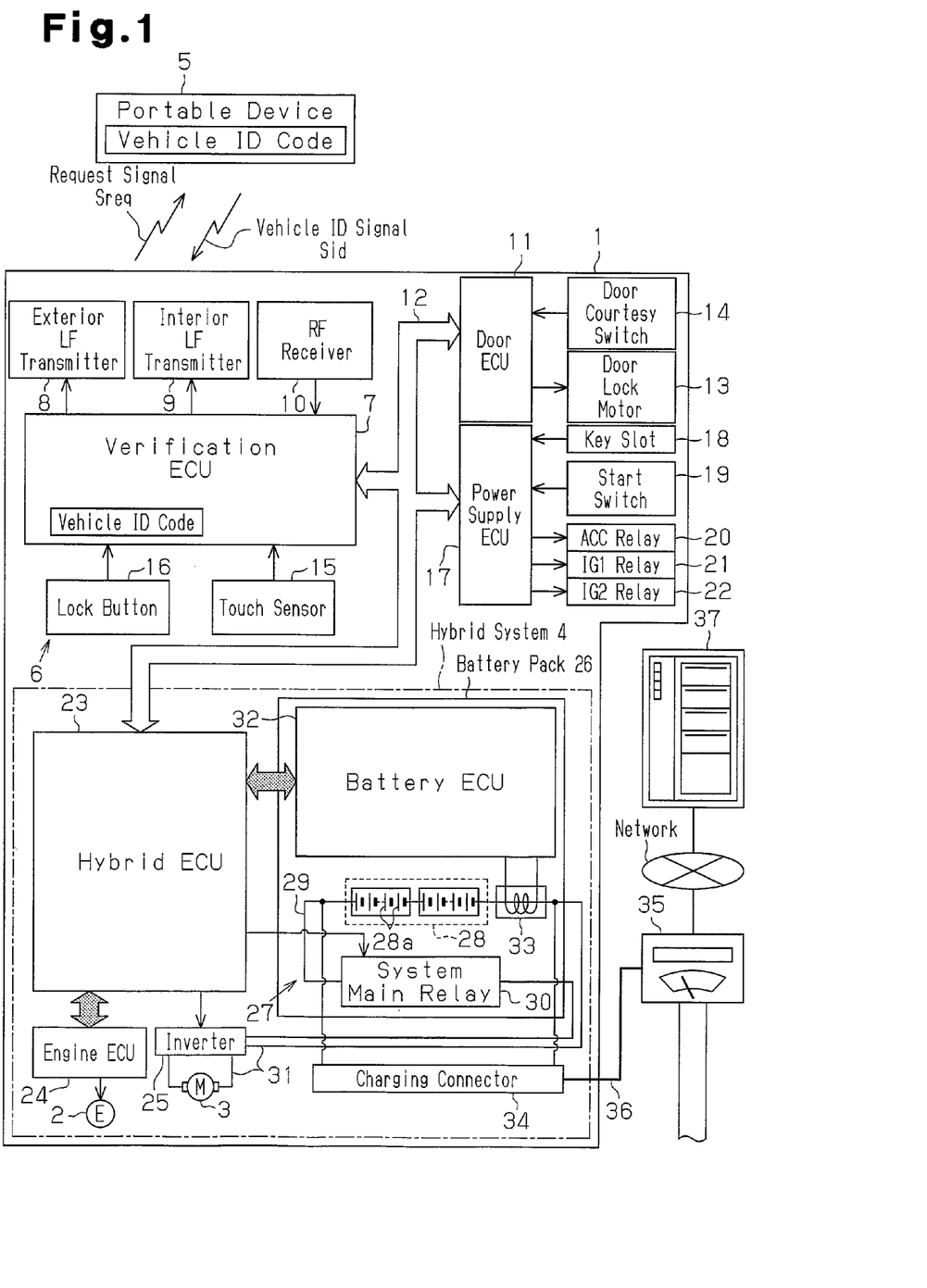
FIG. 1 is a schematic block diagram of a charging system according to a first embodiment of the present invention.

As shown in FIG. 1, when a vehicle is a hybrid vehicle 1, a hybrid system 4, which uses both an engine 2 and a motor 3 as a drive source to drive the vehicle wheels, is installed in the body of the vehicle. The hybrid system 4 controls various modes, such as a mode in which the vehicle is driven by the power of the engine transmitted mechanically to the wheels, a mode in which the vehicle is driven by the electric power generated with the power of the engine, a mode in which the wheels are directly driven by both the engine and the motor, and a mode in which the engine is stopped and the vehicle is driven by only the motor. The hybrid vehicle 1 corresponds to a charging subject.

A hands-free system 6 is installed in the hybrid vehicle 1 to allow the doors to be unlocking or the hybrid system to be activated without a mechanical key as long as the drive is carrying a portable device 5. The hybrid vehicle 1 includes a verification electronic control unit (ECU) 7, which performs ID verification in the hands-free system 6. An exterior low-frequency (LF) transmitter 8, which is located outside the vehicle, an interior LF transmitter 9, which is located inside the vehicle, and a radio-frequency (RF) receiver 10, which is located inside the vehicle, are connected to the verification ECU 7.

Also, a door ECU 11, which controls the locking and unlocking of the doors, is connected to the verification ECU 7 via an interior bus 12. A door lock motor 13, which functions as a drive source for locking and unlocking the doors, is connected to the door ECU 11. A door courtesy switch 14, which detects the open or closed state of the doors, is connected to the door ECU 11. The door ECU 11 receives an opening signal or a closing signal from the door courtesy switch 14, and determines whether the doors are currently open or closed.

When the hybrid vehicle 1 is in a parked state (when the hybrid system is deactivated and the doors are locked), the verification ECU 7 forms a communication area outside the vehicle by controlling the exterior LF transmitter 8 to transmit a low frequency request signal Sreq, which requests for an ID in response. When a plurality of exterior LF transmitters 8 are installed outside the vehicle, the exterior LF transmitters 8 each sequentially transmit a request signal Sreq. The verification ECU 7 repeatedly controls the plurality of transmitters 8 to transmit a request signal Sreq. When the portable device 5 enters the exterior communication area, the portable device 5 receives a request signal Sreq. When receiving the request signal Sreq, the portable device 5 transmits a vehicle ID code (identification code) registered in its memory with a vehicle ID signal Sid in an RF band.

When the RF receiver 10 receives the vehicle ID signal Sid while the verification ECU 7 is controlling the exterior LF transmitters 8 to transmit the request signal Sreq, the verification ECU 7 determines that exterior communication has been performed. The verification ECU 7 then performs exterior verification (identification verification) by comparing the vehicle ID code of the portable device 5 with a code sequence registered in the vehicle. When determining that the exterior verification has been established, the verification ECU 7 activates a touch sensor 15, which has been in a deactivated state. Further, when the touch sensor 15 detects a door handle being touched by a person, the verification ECU 7 transmits a door unlock request signal to the door ECU 11. In response to the door unlock request signal, the door ECU 11 drives the door lock motor 13 to unlock the locked doors.

When detecting that a lock button 16 on a door handle has been pushed down in a state in which the engine of the hybrid vehicle 1 is stopped and the doors are unlocked, the verification ECU 7 again forms a communication area, which is for performing exterior verification, outside the vehicle (exterior communication area) with the exterior LF transmitters 8. When an exterior verification has been established, the verification ECU 7 transmits a door lock request signal to the door ECU 11. In response to the door lock request signal, the door ECU 11 drives the door lock motor 13 to lock the doors.

When the door courtesy switch 14 detects that a driver has entered the vehicle, the verification ECU 7 forms a communication area inside the vehicle (interior communication area) by controlling the interior LF transmitter 9 to transmit a request signal Sreq. When the portable device 5 enters the interior communication area, the portable device 5 returns a vehicle ID signal Sid in response to the request signal Sreq. When the RF receiver 10 receives the vehicle ID signal Sid from the portable device 5 while the verification ECU 7 is controlling the interior LF transmitter 9 to transmit a request signal Sreq, the verification ECU 7 determines that interior communication has been established. The verification ECU 7 then performs interior verification (identification verification) by comparing the vehicle ID code of the portable device 5, which is located in the vehicle, and the vehicle ID code of the vehicle and determines whether the interior verification has been established. The interior verification may also include immobilizer verification performed by comparing the code of a transponder embedded in the portable device 5 with the code of the vehicle.

A power supply ECU 17, which controls power supplies for various electric devices installed in the vehicle, is connected to the verification ECU 7 via the bus 12. The power supply ECU 17 is activated when, for example, the portable device 5 is partially inserted into a key slot 18, which is arranged next to the steering wheel. A start switch 19, which is operated to activate or deactivate the hybrid system 4, is connected to the power supply ECU 17. In the hybrid vehicle 1, the hybrid system 4 is activated when the start switch 19 is operated in a state in which the gearshift lever is located at a parking position and the brake pedal is depressed. Also, an ACC relay 20, which turns the power supplies of accessories on and off, and an IG1 relay 21 and an IG2 relay 22, which switch the ignition system on and off, are connected to the power supply ECU 17.

A hybrid ECU 23, which centrally controls the hybrid system 4, is connected to the verification ECU 7 via the bus 12. An engine ECU 24, which controls ignition and fuel ejection of the engine 2, is connected to the hybrid ECU 23 through controller area network (CAN) communication. The motor 3 is also connected to the hybrid ECU 23 by an inverter 25. The hybrid ECU 23 controls driving force by calculating an engine output and a motor torque suitable for the driving status based on the accelerator degree, the gearshift position, and output signals from various sensors, and outputs required values to the ECUs including the engine ECU 24 and a battery ECU 32 (described later).

A battery pack 26, which is accommodated in a single case and unitized, is mounted on the hybrid vehicle 1. The battery pack 26 contains a battery 27, which serves as a rechargeable battery component. The battery 27 includes a battery module 28, which includes a plurality of series-connected cells 28a, and a system main relay 30, which is connected in series to a high-voltage power supply circuit 29 of the battery module 28. The motor 3 and the inverter 25 are connected to each other by a power cable 31, which is capable of supplying a large current with a high voltage. In the same manner, the inverter 25 and the battery 27 are connected to each other by another power cable 31, which is capable of supplying a large current with a high voltage. The system main relay 30 is connected to the hybrid ECU 23. The system main relay 30 connects or disconnects the high-voltage power supply circuit 29 in response to a command from the hybrid ECU 23. The battery 27 corresponds to a rechargeable battery.

The battery pack 26 contains the battery ECU 32, which monitors the state of charge of the battery 27. The battery ECU 32 is connected to the hybrid ECU 23 through CAN communication. The battery ECU 32 operates in accordance with a control program for monitoring the state of charge stored in its memory (not shown) and monitors the state of charge or charged amount of the battery 27.

A current sensor 33, which detects the amount of current flowing through the high-voltage power supply circuit 29, is connected to a cable of the high-voltage power supply circuit 29. The current sensor 33 is connected to the battery ECU 32 and provides a detection signal in accordance with the value of current flowing through the high-voltage power supply circuit 29 to the battery ECU 32. The battery ECU 32 monitors the state of charge of the battery 27 based on the detection signal from the current sensor 33 and provides the monitoring result to the hybrid ECU 23 in response to a state of charge notification request from the hybrid ECU 23. The hybrid ECU 23 determines the state of charge of the battery 27 based on the monitoring result provided from the battery ECU 32.

The battery pack 26 includes a charging connector 34, which is used as an inlet for electricity when charging the battery 27. The charging connector 34 is connectable to an electricity station 35 via a charging cable 36. The electricity station 35 supplies power to the battery 27 to charge the battery 27. The charging cable 36 is an electric cable extending from the electricity station 35. To charge the battery 27, a distal end of the charging cable 36 is connected to the charging connector 34. When the electricity station 35 starts a charging operation, current flows from the electricity station 35 to the battery 27 through the charging cable 36 and the charging connector 34. This charges the battery 27. The electricity station 35 corresponds to a charging device. The charging cable 36 corresponds to an electric cable.

The electricity station 35 is connected to a vehicle registration server 37 so as to enable network communication between the electricity station 35 and the vehicle registration server 37. The hybrid vehicle 1 has a vehicle ID code registered in the vehicle registration server 37. The vehicle ID code is registered in the vehicle registration server 37 by applying for registration to, for example, a motor vehicle official or a security company. The network communication between the electricity station 35 and the vehicle registration server 37 may be in performed in various forms, such as through communication with the Internet, a Wide Area Network (WAN), or a Local Area Network (LAN). The communication may be performed through wired and wireless communication. The vehicle registration server 37 corresponds to a server.

Figure 2:
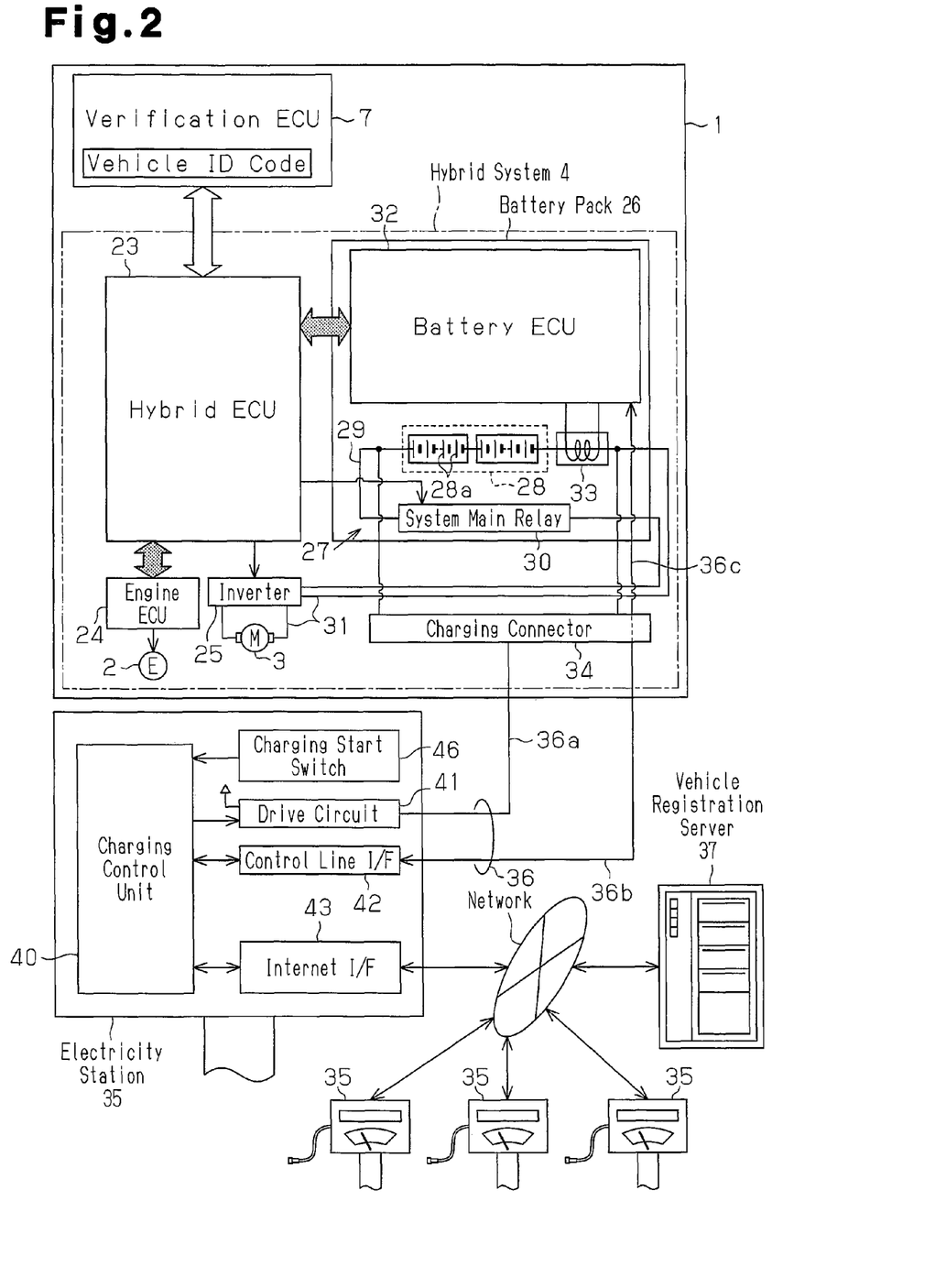
FIG. 2 is a detailed block diagram of the charging system of FIG. 1.
Figure 3:
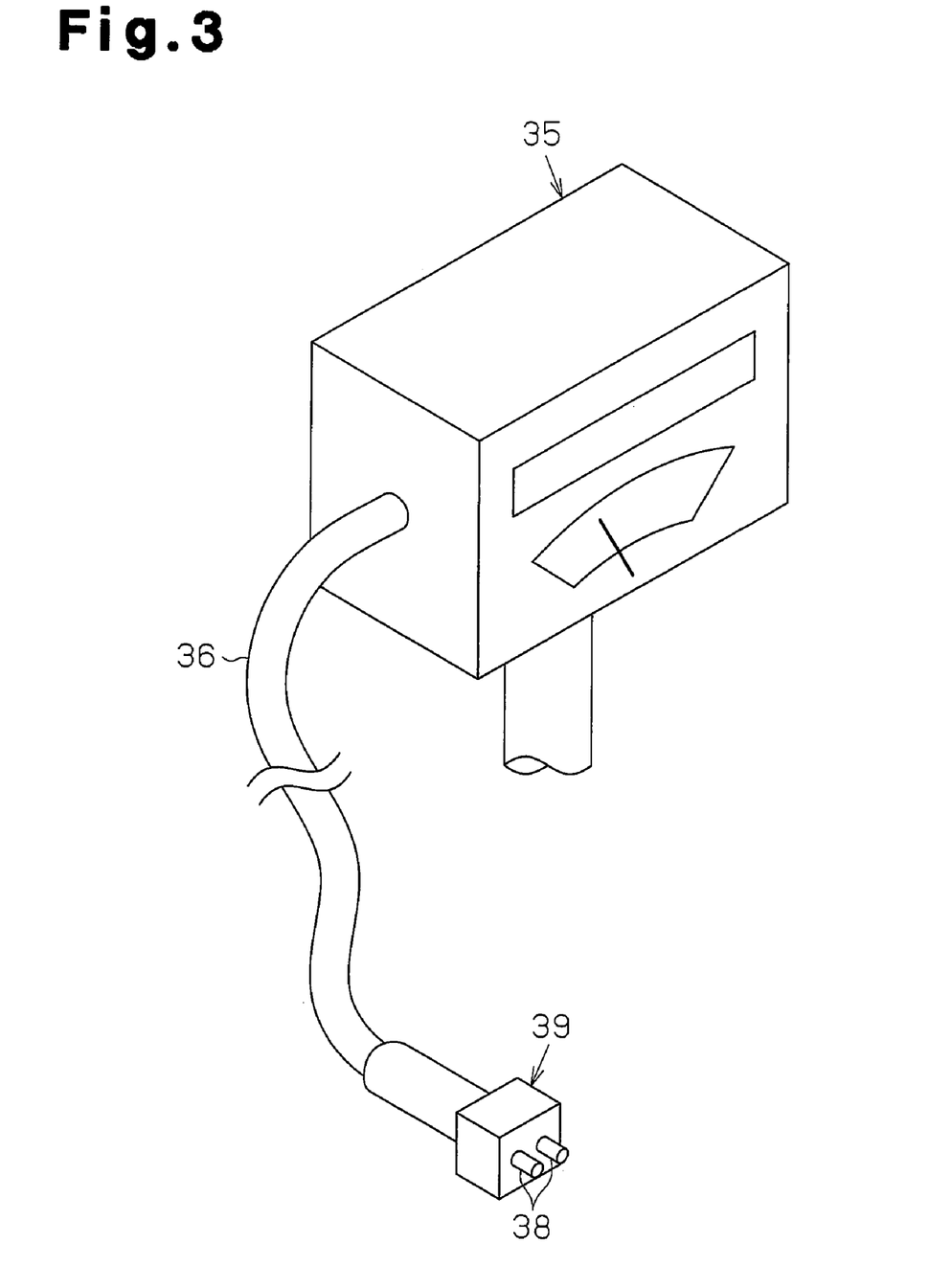
FIG. 3 is a schematic perspective view showing an electricity station.

As shown in FIG. 2, the charging cable 36 includes a power line 36a and a control line 36b. The power line 36a is an electric line capable of supplying a large current with a high voltage. The control line 36b is used to transmit a control command from the electricity station 35 to the battery ECU 32. As shown in FIG. 3, a power feed connector 39, which has a contact terminal 38, is arranged on a distal end of the charging cable 36. To charge the battery 27 with the electricity station 35, the power feed connector 39 is connected to the charging connector 34. When the charging cable 36 is connected to the charging connector 34, the control line 36b is connected to a communication line 36c of a control system extending from the charging connector 34 to the battery ECU 32.

As shown in FIG. 2, the electricity station 35 includes a charging control unit 40, which centrally controls the electricity station 35. The charging control unit 40 includes devices, such as a central processing unit (CPU), a ROM (read-only memory), and a random-access memory (RAM) (none shown), and operates based on a control program stored in the ROM. The charging control unit 40 is connected to the power line 36a of the charging cable 36 via a drive circuit 41 and connected to the control line 36b via a control line interface 42. The charging control unit 40 is also connected through a network to the vehicle registration server 37 via an Internet interface 43, through which data is input and output.

When the electricity station 35 is operated to start charging, the charging control unit 40 provides an ID check request to the hybrid ECU 23 via the control line 36b, the communication line 36c, and the battery ECU 32. In response to the request, the hybrid ECU 23 transmits the vehicle ID code obtained from the verification ECU 7 to the charging control unit 40 of the electricity station 35 via the battery ECU 32, the communication line 36c, and the control line 36b. When receiving the vehicle ID code from the hybrid ECU 23, the charging control unit 40 performs registered ID verification by determining whether the received vehicle ID code has been registered in the vehicle registration server 37. When the registered ID verification is established, the charging of the battery 27 is permitted. In such a case, the charging control unit 40 charges the battery 27 with current supplied through the power line 36a.

Encrypted communication is performed during data communication between the battery ECU 32 and the hybrid ECU 23 when the electricity station 35 obtains the vehicle ID code from the hybrid ECU 23. Encrypted communication is also performed during network communication between the electricity station 35 and the vehicle registration server 37. The encrypted communication is based on, for example, a challenge-response technique using a random number generated when, for example, data is transmitted. With this technique, the hybrid vehicle 1 and the electricity station 35 each encrypts the random number with its own encryption key. Authentication is then performed by determining whether the encrypted value obtained by the hybrid vehicle 1 and the encrypted value obtained by the electricity station 35 are the same.

The operation of the charging system in the first embodiment will now be described.

Figure 4:
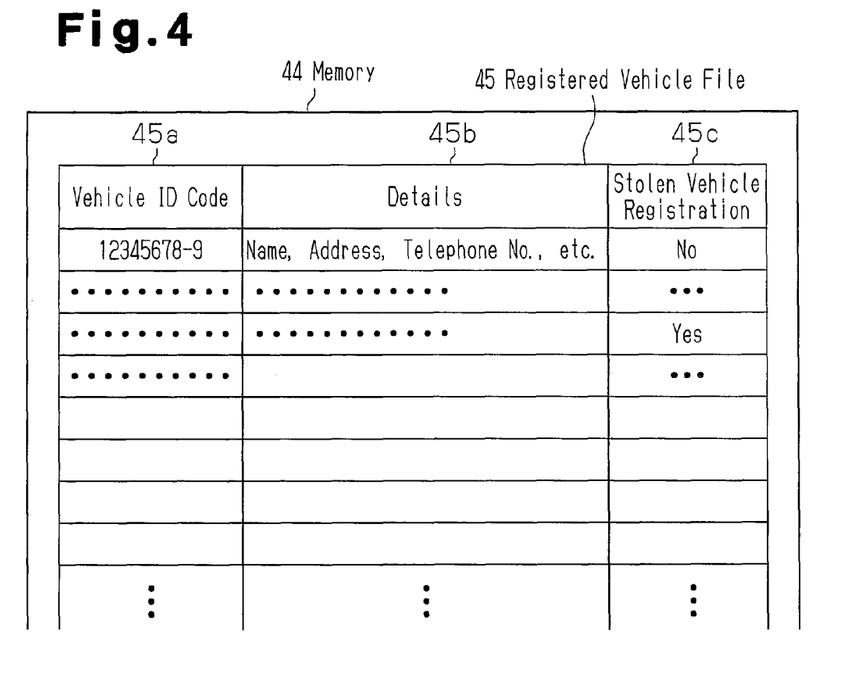
FIG. 4 is a conceptual diagram of a registered vehicle file stored in a memory of a vehicle registration server shown in FIG. 2.
Figure 5:
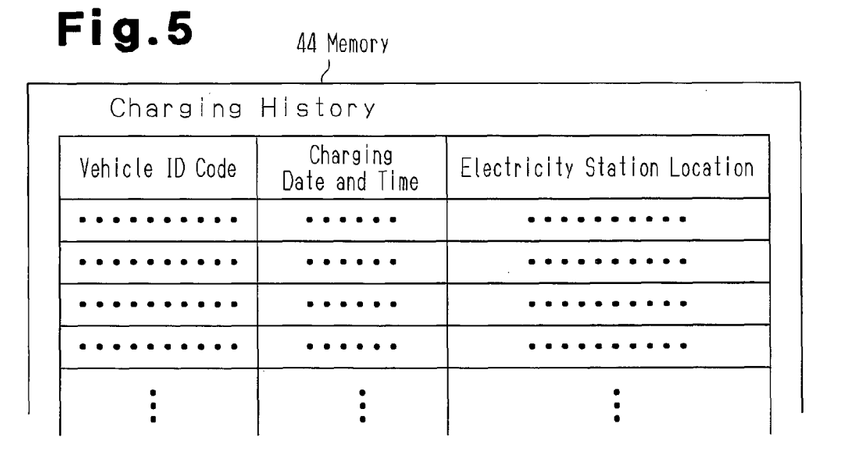
FIG. 5 is a conceptual diagram of a charging history stored in the memory of the vehicle registration server shown in FIG. 2.

First, a registration process for registering the vehicle ID code stored in the verification ECU 7 of the hybrid vehicle 1 into the vehicle registration server 37 is performed. Referring to FIG. 4, through the registration process, the vehicle ID code of the registered vehicle is written to an ID code field 45a of a registered vehicle file 45, which is stored in a memory 44 of the vehicle registration server 37. In addition to the ID code field 45a to which the vehicle ID code is written, the registered vehicle file 45 includes an owner information field 45b, into which details of the vehicle owner are written, and a stolen vehicle registration field 45c.

The charging start operation of the electricity station 35 is performed by, for example, turning on a charging start switch 46, which is arranged on the electricity station 35, when the power feed connector 39 of the charging cable 36 is connected to the charging connector 34 of the hybrid vehicle 1. When detecting the charging start operation, the charging control unit 40 transmits an ID check request to the battery ECU 32 via the control line 36b and the communication line 36c.

When receiving the ID check request, the battery ECU 32 transfers the received request to the hybrid ECU 23. In response to the ID check request transferred from the battery ECU 32, the hybrid ECU 23 transmits the request to the verification ECU 7. In response to the ID check request transmitted from the hybrid ECU 23, the verification ECU 7 returns its registered vehicle ID code to the hybrid ECU 23. The hybrid ECU 23 transmits the vehicle ID code from the verification ECU 7 to the charging control unit 40 of the electricity station 35 via the battery ECU 32, the communication line 36c, and the control line 36b.

The charging control unit 40 performs encrypted communication based on the above challenge-response technique during data communication between the hybrid ECU 23 and the electricity station 35. In detail, when transmitting the ID check request to the hybrid ECU 23, the charging control unit 40 generates a predetermined random number, adds the random number to the data sequence of the ID check request, and transmits the resulting data group to the hybrid ECU 23 as the ID check request.

The hybrid ECU 23 encrypts the random number included in the data group (ID check request) with its own encryption key. The hybrid ECU 23 adds the encrypted random number to the code sequence of the vehicle ID code and returns the resulting data group to the charging control unit 40 of the electricity station 35 as the vehicle ID code.

Subsequently, the charging control unit 40 encrypts the generated random number with its own encryption key and compares the encrypted random number with the encrypted random number in the vehicle ID code returned from the hybrid ECU 23. When the hybrid ECU 23 to which the data has been transferred corresponds to the electricity station 35, the encryption keys of the hybrid ECU 23 and the electricity station 35 are identical to each other. In such a case, the two encrypted random numbers should be the same. Thus, when the random number encrypted by the hybrid vehicle 1 and the random number encrypted by the electricity station 35 are the same, the encrypted communication is authenticated. When the encrypted communication has been authenticated, the charging control unit 40 accepts the vehicle ID code.

The encrypted communication based on the challenge-response technique includes encryption performed by replacing some bits of a random number and performing an addition operation and an exclusive-OR operation of the random number in which some bits have been replaced and an encryption key. Another example of encrypted communication includes conjugating or adding a random number and an encryption key and subjecting the addition result to a Hash function, such as Message Digest Algorithm 5 (MD5) or Secure Hash Algorithm (SHA). The encrypted communication method is of course not limited to these methods, and various types of encryption methods may be used.

The charging control unit 40 transmits the vehicle ID code obtained from the vehicle to the vehicle registration server 37 through network communication. The vehicle registration server 37 performs registered ID verification by determining whether the vehicle ID code has been registered in its memory 44, and determines whether charging is permitted based on the verification result. When determining that the vehicle ID code has been registered in its memory 44, the vehicle registration server 37 returns to the charging control unit 40 by network communication a message indicating that the vehicle ID code has been registered.

The charging control unit 40 determines that the registered ID verification has been established based on the message from the vehicle registration server 37 indicating that the vehicle ID code has been registered. The charging control unit 40 then sets the vehicle to a charging permission state in which charging of the vehicle is permitted. The charging control unit 40 then starts supplying the charging current from the power line 36a to the battery 27 of the vehicle to start charging the battery 27.

During the battery charging, the charging control unit 40 monitors the charged electricity amount of the battery 27 by constantly monitoring the voltage across the battery 27. When determining that the battery 27 reaches a fully charged state, the charging control unit 40 stops supplying current from the power line 36a to stop charging the battery 27.

When the vehicle ID code of the verification ECU 7 is not stored in the memory 44 of the vehicle registration server 37 in the registered ID verification, the charging control unit 40 receives from the vehicle registration server 37 a message indicating that the vehicle ID code of the vehicle is not registered (charging prohibition command). In such a case, the charging control unit 40 is set in a charging prohibition state in which charging of the vehicle is prohibited. In such a case, the charging control unit 40 prohibits current from being supplied from the power line 36a to the battery 27 and does not charge the battery 27 even when the charging start operation of the electricity station 35 is performed.

The encrypted communication based on the above challenge-response technique is used to transmit data through network communication between the electricity station 35 and the vehicle registration server 37. Instead of the challenge-response technique, the encrypted communication may be performed based on common key cryptography, such as the Data Encryption Standard (DES) or Advanced Encryption Standard (AES), or public key cryptography, such as RSA. Further, a hybrid technique combining common key cryptography and public key cryptography may also be used.

Accordingly, when charging the battery 27 of the hybrid vehicle 1 with the electricity station 35, the electricity station 35 is activated only when the vehicle ID code of the charging subject vehicle is registered in the vehicle registration server 37. That is, the vehicle ID code of the charging subject vehicle must be registered in the vehicle registration server 37 or else the battery 27 of the vehicle cannot be charged. Thus, even if the hybrid vehicle 1 is stolen by a thief, it cannot be charged by the electricity station 35 unless the vehicle ID code of the stolen vehicle is registered in the vehicle registration server 37. This system decreases the number of electricity stations 35 that can be used to charge the stolen vehicle and consequently shortens the distance by which the stolen vehicle can be driven. As a result, the stolen vehicle may be tracked within a narrower range. This enables the stolen vehicle to be tracked more easily and improves the possibility of the stolen vehicle being found.

Further, if an unauthorized operator who has not taken the required vehicle ID code registration procedures with the vehicle registration server 37 tries to charge the battery 27 of the vehicle with the electricity station 35, the electricity station 35 will not start the charging operation. As a result, unauthorized charging of the battery 27 with the electricity station 35 becomes difficult. This effectively prevents electricity from being stolen.

Additionally, the vehicle registration server 37 detects the charging operation of the battery 27 performed by the electricity station 35 and accumulates the charging history in its memory 44. In detail, when the electricity station 35 is used to charge the battery 27, the charging control unit 40 transmits a station ID code (device-number code) unique to the electricity station 35 to the vehicle registration server 37 together with a message indicating that the charging has been started. In response to the charging start message, referring to FIG. 5, the vehicle registration server 37 writes to the memory 44, as the charging history, the vehicle ID code of the vehicle for which the charging operation is performed, the charging time and date, and the station ID code of the electricity station 35 used to charge the vehicle.

Thus, when the electricity station 35 is used to charge the registered vehicle, the charging history of the vehicle is accumulated in the vehicle registration server 37. The charging history indicates when and where each registered vehicle has been charged. Therefore, if a vehicle is stolen and the stolen vehicle is charged by an electricity station 35, by managing the charging history, the electricity station 35 would used to charge the stolen vehicle would be located. As a result, the current position of the stolen vehicle can be determined. This enables the stolen vehicle to be tracked more easily and provides the vehicle with an effective antitheft measure.

Referring to FIG. 4, the vehicle registration server 37 may also register information on a stolen vehicle. For example, a stolen vehicle is registered in the vehicle registration server 37 by writing information on the stolen vehicle into the stolen vehicle registration field 45c so that the stolen vehicle information is associated with the corresponding vehicle ID code in the registered vehicle file 45. The stolen vehicle may be registered, for example, through network communication using a communication terminal, such as a personal computer or a cellular phone, or by notifying a motor vehicle official or a security company that manages the vehicle registration server 37 of the stolen vehicle using a phone or the like.

When charging the battery 27 of the vehicle with the electricity station 35, the vehicle registration server 37 first determines whether the vehicle ID code of the charging subject vehicle has been registered in the memory 44. The vehicle registration server 37 also determines whether the charging subject vehicle identified by the vehicle ID code is a stolen vehicle by referring to the stolen vehicle registration field 45c of the registered vehicle file 45. If the charging subject vehicle is a stolen vehicle, the vehicle registration server 37 transmits a message indicating that the vehicle is a stolen vehicle (or a message indicating that the vehicle ID code has not been registered) together with the corresponding vehicle ID code to the electricity station 35. In response to the message indicating the stolen vehicle, the charging control unit 40 is set in a charging prohibition state in which charging of the vehicle is prohibited. In this state, even when the charging start operation of the electricity station 35 is performed, current is not supplied from the power line 36a to the battery 27. Thus, the battery 28 is not charged.

If a registered vehicle is stolen, the registered vehicle can be registered as a stolen vehicle in the vehicle registration server 37. This disables charging of the battery 27 with the electricity station 35. Without the battery 27 being charged, the battery 27 will drain after a while and the vehicle will stop. In such a case, a thief who has stolen the vehicle will ultimately have to leave the vehicle. This provides the vehicle with an effective antitheft measure.

The charging system of the first embodiment has the advantages described below.

(1) When charging the battery 27, the vehicle cannot be charged by the electricity station 35 unless the vehicle ID code of the vehicle is registered in the registration server 37. Thus, even if the hybrid vehicle 1 is stolen by a thief, the hybrid vehicle 1 cannot be charged by the electricity station 35, which is managed by the vehicle registration server 37. This system decreases the number of public electricity stations 35 that can be used to charge the stolen vehicle and consequently shortens the distance by which the stolen vehicle can be driven. As a result, the stolen vehicle can be tracked within a narrower range. This enables the stolen vehicle to be tracked more easily and increases the possibility of the stolen vehicle being found.

(2) The battery 27 cannot be charged by the electricity station 35 unless the vehicle ID code is registered in advance in the vehicle registration server 37. Thus, even if an unauthorized user who has not registered the ID code-tries to use the electricity station 35, the electricity station 35 cannot be activated. This makes it difficult to perform unauthorized charging with the electricity station 35 and prevents electricity from being stolen by a thief.

(3) The vehicle registration server 37, which has high data processing capacity, performs the ID verification. This shortens the time required for the ID verification. Also, the electricity station 35 performs the registered ID verification. This eliminates the need for installing a communication mechanism for ID-verification on the vehicle. Accordingly, the structures of components associated with the communication system and components associated with the computer system of the vehicle are prevented from becoming complicated.

(4) When performing charging with the electricity station 35, the charging history is accumulated in the vehicle registration server 37. The charging history indicates when the vehicle was charged by the electricity station 35. If the electricity station 35 is used without an authorized user's permission, the charging history indicates to the authorized user such unauthorized use of the electricity station 35. This system prevents unauthorized charging. The charging history also indicates which electricity station 35 was used. Accordingly, when the battery 27 of a stolen vehicle is charged by an electricity station 35, the location of the electricity station 35 can be determined as the current location of the stolen vehicle. This enables the stolen vehicle to be tracked and provides the vehicle with a more effective antitheft measure.

(5) When a stolen vehicle is registered in the vehicle registration server 37, even if a thief tries to use the electricity station 35 to charge the battery 27 of the stolen vehicle, the electricity station 35 cannot be set in a charging permission state. The electricity station 35 is instead set in a charging prohibition state in which charging of the battery 27 of the stolen vehicle is prohibited. Accordingly, the battery 27 of the stolen vehicle registered in the vehicle registration server 37 will drain after a while, and the vehicle will stop. In that case, the thief who has stolen the vehicle will ultimately leave the vehicle. The stolen vehicle registration will therefore provide the vehicle with a more effective antitheft measure.

(6) Encrypted communication is performed during the data communication between the hybrid vehicle 1 and the electricity station 35 and the data communication between the electricity station 35 and the vehicle registration server 37. This makes it difficult to hamper verifications. Thus, unauthorized charging is effectively prevented.

Second Embodiment

A charging system according to a second embodiment of the present invention will now be described with reference to FIG. 6. The second embodiment describes another form of the registered ID verification described in the first embodiment. The components of the second embodiment that are the same as the components of the first embodiment are given the same reference numerals as those components and are therefore not described in detail.

Figure 6:
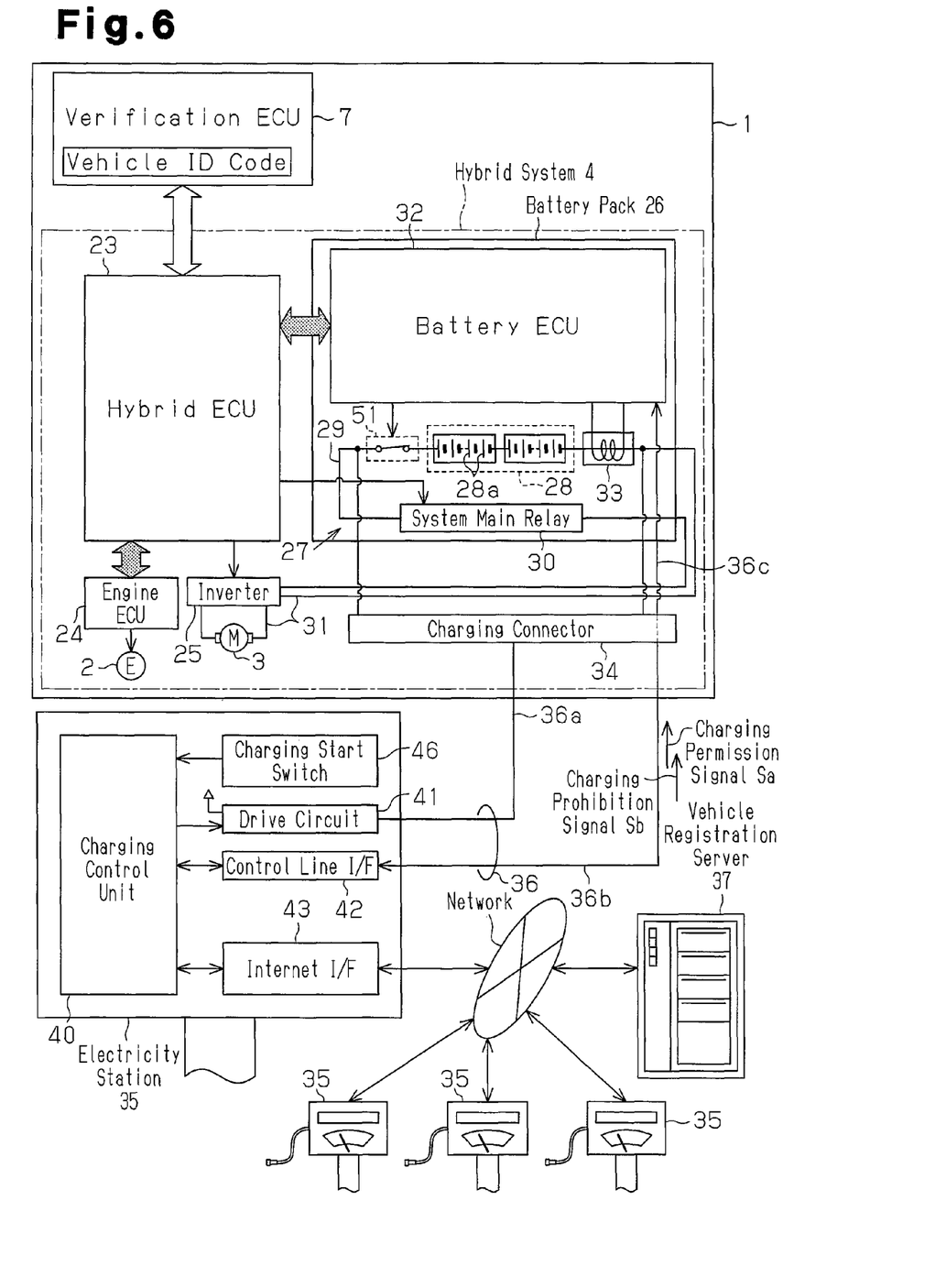
FIG. 6 is a schematic block diagram of a charging system according to a second embodiment of the present invention.

Referring to FIG. 6, a switch 51 for energizing and de-energizing the high-voltage power supply circuit 29, is connected in series to the high-voltage power supply circuit 29. A series-connected circuit including the battery module 28, the current sensor 33, and the switch 51 are connected in series to the charging connector 34. The switch 51, which is connected to the battery ECU 32, is turned on and off based on a command from the battery ECU 32. The switch 51 is normally on. The switch 51 is turned off when the battery ECU 32 receives a charging prohibition command from the electricity station 35. When the switch 51 is turned off, charging is prohibited.

When detecting that an operation for turning on the charging start switch 46 has been performed in a state in which the charging cable 36 is connected to the charging connector 34 of the vehicle, the charging control unit 40 starts to supply current from the power line 36a to the battery 27 regardless of the registered ID verification result. At the same time as when starting the current supply, the charging control unit 40 transmits an ID check request to the hybrid ECU 23 via the control line 36b, the communication line 36c, and the battery ECU 32, and obtains a vehicle ID code registered in the verification ECU 7.

The charging control unit 40 transmits the vehicle ID code transmitted from the vehicle to the vehicle registration server 37 through network communication. The vehicle registration server 37 determines whether the vehicle ID code has been registered in the memory 44. When receiving a message from the vehicle registration server 37 indicating that the vehicle ID code has been registered, the charging control unit 40 determines that the registered ID verification has been established and sets a charging permission state in which charging of the vehicle is permitted.

The charging control unit 40 set in the charging permission state transmits a charging permission signal Sa to the battery ECU 32 via the control line 36b and the communication line 36c. In response to the charging permission signal Sa, the battery ECU 32 keeps the switch 51 on to keep the high-voltage power supply circuit 29 closed As a result, charging current is supplied from the electricity station 35 to the battery 27 via the power line 36a to charge the battery 27.

When receiving a message from the vehicle registration server 37 indicating that the vehicle ID code has not been registered, the charging control unit 40 determines that the registered ID verification has not been established and is set in a charging prohibition state for prohibiting charging of the vehicle.

The charging control unit 40 set in the charging prohibition state transmits a charging prohibition signal Sb to the battery ECU 32 via the control line 36b and the communication line 36c. In response to the charging prohibition signal Sb, the battery ECU 32 turns off the activated switch 51 to de-energize the high-voltage power supply circuit 29. As a result, the charging current supplied from the electricity station 35 via the power line 36a does not flow to the battery 27 and the battery 27 is not charged. When detecting that an operation for stopping charging with the electricity station 35 has been performed via the control line 36b and the communication line 36c, the battery ECU 32 returns the switch 51 to the activated state.

In the second embodiment described above, when the vehicle ID code is not registered in the vehicle registration server 37, that is, when the registered ID verification is not established, the high-voltage power supply circuit 29 is set as an open circuit. As a result, even when the electricity station 35 is designed to start supplying current at the same time as when the charging start switch 46 of the electricity station 35 is turned on, this system prevents the charging current from flowing to the battery 27 when registered ID verification is not established. The electricity station 35 does not necessarily have to start supplying current at this timing.

In addition to advantages (1) to (6) of the first embodiment, the charging system of the second embodiment has the advantage described below.

(7) The switch 51 is turned off when the registered ID verification is not established. Thus, even if the electricity station 35 is designed to start supplying current when the charging start switch 46 of the electricity station 35 is pushed regardless of the result of the registered ID verification, this system prevents current from flowing to the battery 27.

Third Embodiment

A charging system according to a third embodiment of the present invention will now be described with reference to FIG. 7. The third embodiment describes another form of the registered ID verification described in the second embodiment. The components of the third embodiment that are the same as the components of the second embodiment are given the same reference numerals as those components and will not be described in detail.

Figure 7:
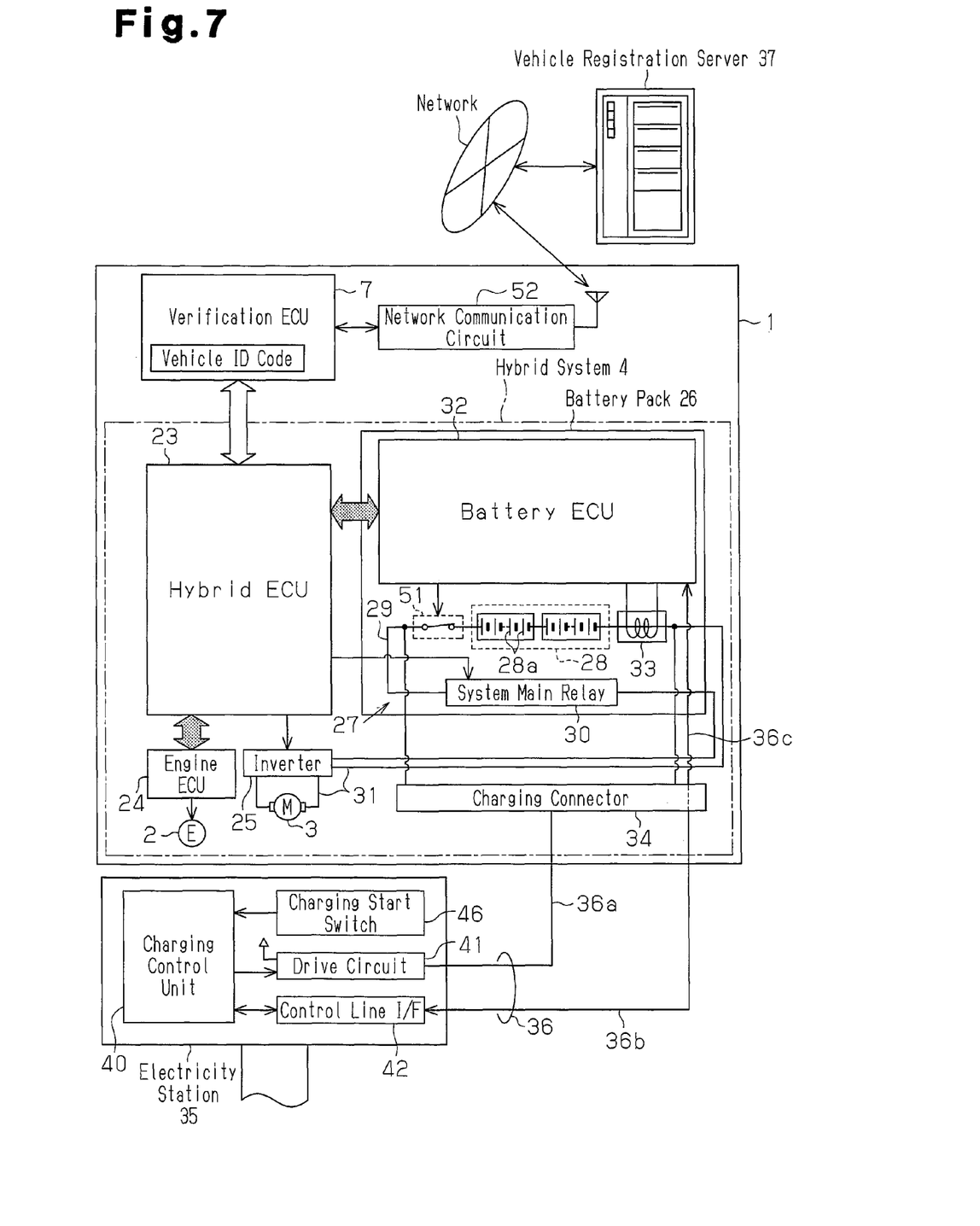
FIG. 7 is a schematic block diagram of a charging system according to a third embodiment of the present invention.

As shown in FIG. 7, a network communication circuit 52, which performs wireless network communication with the vehicle registration server 37, is installed in the hybrid vehicle 1. The network communication circuit 52 is connected to the verification ECU 7 and operates based on a command from the verification ECU 7. The network communication circuit 52 can perform wireless LAN communication with, for example, a hot spot installed in a building. The network communication circuit 52 transmits and receives data to and from the vehicle registration server 37 through network communication performed via a wireless LAN.

When detecting that an operation for turning on the charging start switch 46 has been performed in a state in which the charging cable 36 is connected to the vehicle charging connector 34, the charging control unit 40 starts to supply current from the power line 36a to the battery 27. The charging control unit 40 further transmits an ID check request to the hybrid ECU 23 via the control line 36b, the communication line 36c, and the battery ECU 32. In response to the ID check request, the hybrid ECU 23 sends the received request to the verification ECU 7.

In response to the ID check request from the hybrid ECU 23, the verification ECU 7 transmits its registered vehicle ID code to the vehicle registration server 37 via a network from the network communication circuit 52. The vehicle registration server 37 determines whether the vehicle ID code transmitted from the verification ECU 7 is registered in its memory 44. When the vehicle ID code is registered, the vehicle registration server 37 returns a message to the verification ECU 7 indicating that the vehicle ID code is registered via the network and the circuit 52.

The verification ECU 7 transfers the message indicating that the vehicle ID code has been registered to the battery ECU 32 via the hybrid ECU 23. In response to the message indicating that the vehicle ID code has been registered, the battery ECU 32 is set in a charging permission state in which charging of the battery 27 is permitted.

The battery ECU 32 set in the charging permission state keeps the switch 51 on to keep the high-voltage power supply circuit 29 closed. As a result, the charging current is supplied from the electricity station 35 to the battery 27 via the power line 36a to charge the battery 27.

When receiving a message from the vehicle registration server 37 indicating that the vehicle ID code is not registered, the verification ECU 7 transfers the message to the battery ECU 32 via the hybrid ECU 23. In response to the message indicating that the vehicle ID code is not registered, the battery ECU 32 is set in a charging prohibition state in which the battery 27 cannot be charged.

The battery ECU 32 set in the charging prohibition state turns off the activated switch 51 to de-energize the high-voltage power supply circuit 29. As a result, the charging current supplied from the electricity station 35 via the power line 36a does not flow to the battery 27, and the battery 27 is not charged.

In the third embodiment, the verification communication mechanism for performing the registered ID verification is installed in the vehicle. This eliminates the need to install a communication mechanism for ID verification on the electricity station 35 and simplifies the structure of the electricity station 35. Further, the verification communication mechanism installed in the vehicle, which is located closer to the vehicle owner than a verification communication mechanism installed in an electricity station 35 at public facilities will be less likely to be replaced in an unauthorized manner. Installing the verification communication mechanism in the vehicle will therefore more effectively prevent unauthorized charging.

In addition to the advantages (1) to (7) of the first and second embodiments, the charging system of the third embodiment has the advantage described below.

(8) The registered ID verification is performed between the hybrid vehicle 1 and the vehicle registration server 37. This eliminates the need to arrange a communication mechanism for ID verification in the electricity station 35. This simplifies the structure of the electricity station 35 and eliminates the need to drastically change the design of the electricity station 35.

The above embodiments may be modified in the following forms.

In the first to third embodiments, the server 37 does not necessarily have to perform the registered ID verification to determine whether the hybrid vehicle 1 is permitted to be charged using the electricity station 35. For example, when a stolen vehicle is registered in the server 37, the server 37 may transmit, together with the vehicle ID code of the stolen vehicle, a charging prohibition message (charging prohibition command) indicating to prohibit charging of a vehicle having that vehicle ID code. The electricity station 35 stores the command together with the vehicle ID code and determines whether charging is permitted in accordance with such storage contents. More specifically, when the vehicle ID code of the hybrid vehicle 1 (charging subject) is a code sequence of the vehicle for which the charging prohibition command has been issued, the electricity station 35 prohibits the vehicle from being charged. This eliminates the need to perform the processing of comparing all of the code sequences registered in the server 37 with the code sequence of the charging subject vehicle, which would otherwise be required whenever the hybrid vehicle 1 is charged by the electricity station 35. As a result, the ID verification requires only simple processing.

In the first to third embodiments, power line communication (PLC) performed using the power line 36a as a data transfer path may be used as the data communication between the hybrid vehicle 1 and the electricity station 35. In this case, the control line 36b is eliminated, and the number of cables connecting the hybrid vehicle 1 and the electricity station 35 is reduced. This reduces the cost for components required by cables.

In the first to third embodiments, the registered ID verification does not necessarily have to be performed by the vehicle registration server 37. The vehicle registration server 37 may transfer a list of its centrally managed vehicle ID codes to the hybrid vehicle 1 or to the electricity station 35. In this case, instead of the vehicle registration server 37, the hybrid vehicle 1 or the electricity station 35 performs the registered ID verification.

In the first to third embodiments, the items of the charging history is not limited to the vehicle ID code, the charging time and date, and the station ID code of the electricity station 35, but may further include the charging time or the state of charge of the battery when starting charging. The charging history may also be stored in the electricity station 35.

In the first to third embodiments, the operation of prohibiting the battery 27 from being charged when the registered ID verification is not established may be performed by either stopping the current supply from the electricity station 35 or by turning off the switch 51 connected to the battery 27 to cut the current flowing through the battery 27 (current flows from the electricity station 35).

In the first to third embodiments, different vehicle ID codes may be registered in the verification ECU 7 between the ID verification performed when the doors are unlocked or the hybrid system is activated and the registered ID verification performed when the determination as to whether charging is permitted is performed. In this case, for example, a special ID code for the registered ID verification is registered in the verification ECU 7.

In the first to third embodiments, the vehicle ID code registered in the hybrid vehicle 1 is not limited to a fixed value and may be rewritable.

In the first to third embodiments, the charging device is not limited to the electricity station 35 and may be a household charging device installed in a house.

In the first to third embodiments, the vehicle is not limited to the hybrid vehicle 1 and may be an electric vehicle driven only by a motor. Also, the charging subject is not be limited to a vehicle and may be any apparatus or device driven by the battery 27, which functions as a drive source.

In the second and third embodiments, the switch for connecting or disconnecting the high-voltage power supply circuit 29 is not limited to the mechanical contact switch 51.

The invention claimed is:

1. A charging system comprising:
a vehicle including a verification ECU in which a unique vehicle identification code is registered, a battery ECU connected to the verification ECU in a communicable manner, and a battery connected to the battery ECU;
a charging device, connectable to the battery and battery ECU of the vehicle by an electric cable, in which the charging device transmits a vehicle identification code check request to the verification ECU through the electric cable and the battery ECU, and the verification ECU reads the vehicle identification code in response to the check request; and
a server, connected to either one of the charging device and the vehicle, for managing charging of the vehicle with the charging device and registering the vehicle identification code;
wherein the server obtains from the vehicle the vehicle identification code read by the verification ECU, determines whether or not the obtained vehicle identification code is registered in the server, and transmits to the charging device a charging prohibition command for prohibiting charging of the vehicle with the charging device when the obtained vehicle identification code is not registered in the server;
the server further registers the vehicle identification code in association with whether or not charging of the vehicle with the charging device is permitted, and when obtaining from the vehicle the vehicle identification code for which charging is registered as not permitted, the server transmits the obtained vehicle identification code and the charging prohibition command to the charging device; and
the charging device prohibits charging of the vehicle identified by the vehicle identification code related with the charging prohibition command.

2. The charging system according to claim 1, wherein:
the server is connected to the charging device; and
the charging device receives the charging prohibition command directly from the server.

3. The charging system according to claim 1, wherein:
the server is connected to the vehicle; and
the charging device receives the charging prohibition command from the server via the vehicle.

4. The charging system according to claim 1, wherein the server further accumulates a charging history including at least the vehicle identification code and a charging time.

5. The charging system according to claim 4, wherein:
the charging device transmits a device number code unique to the charging device to the server when charging the vehicle; and
the server stores the device number code transmitted from the charging device as the location of the charging device to accumulate charging locations of the vehicle as the charging history.

6. The charging system according to claim 1, wherein:
the electric cable includes a power line for supplying power from the charging device to the vehicle; and
the vehicle and the charging device communicate data through power line communication using the power line as a data transfer path.

7. The charging system according to claim 5, wherein:
the electric cable includes a power line for supplying power from the charging device to the vehicle; and
the vehicle and the charging device communicate data through power line communication using the power line as a data transfer path.

8. The charging system according to claim 2, wherein the server further accumulates a charging history including at least the vehicle identification code and a charging time.

9. The charging system according to claim 8, wherein:
the charging device transmits a device number code unique to the charging device to the server when charging the vehicle; and
the server stores the device number code transmitted from the charging device as the location of the charging device to accumulate charging locations of the vehicle as the charging history.

10. The charging system according to claim 9, wherein:
the electric cable includes a power line for supplying power from the charging device to the vehicle; and
the vehicle and the charging device communicate data through power line communication using the power line as a data transfer path.

11. The charging system according to claim 3, wherein the server further accumulates a charging history including at least the vehicle identification code and a charging time.

12. The charging system according to claim 11, wherein:
the charging device transmits a device number code unique to the charging device to the server when charging the vehicle; and
the server stores the device number code transmitted from the charging device as the location of the charging device to accumulate charging locations of the vehicle as the charging history.

13. The charging system according to claim 12, wherein:
the electric cable includes a power line for supplying power from the charging device to the vehicle; and
the vehicle and the charging device communicate data through power line communication using the power line as a data transfer path.

14. The charging system according to claim 2, wherein:
the electric cable includes a power line for supplying power from the charging device to the vehicle; and
the vehicle and the charging device communicate data through power line communication using the power line as a data transfer path.

15. The charging system according to claim 3, wherein:
the electric cable includes a power line for supplying power from the charging device to the vehicle; and
the vehicle and the charging device communicate data through power line communication using the power line as a data transfer path.

16. The charging system according to claim 4, wherein:
the electric cable includes a power line for supplying power from the charging device to the vehicle; and
the vehicle and the charging device communicate data through power line communication using the power line as a data transfer path.

* * * * *